United States Patent

Shaw et al.

[11] Patent Number: 6,033,146
[45] Date of Patent: Mar. 7, 2000

[54] GLASS CHIP LITHOCRETE AND METHOD OF USE OF SAME

[76] Inventors: Lee A. Shaw, 1924 Irvine Ave., Newport Beach, Calif. 92660; Ronald D. Shaw, 1988 Pelican, Costa Mesa, Calif. 92626

[21] Appl. No.: 09/271,811

[22] Filed: Mar. 18, 1999

Related U.S. Application Data

[63] Continuation of application No. 08/866,034, May 30, 1997.

[51] Int. Cl.[7] ........................................... E01C 11/24
[52] U.S. Cl. .................. 404/20; 404/82; 52/742.1; 52/315
[58] Field of Search .................. 52/741.1, 742.1, 52/315; 264/31, 82, 256, 333, DIG. 43; 404/20, 82

[56] References Cited

U.S. PATENT DOCUMENTS

| | | | |
|---|---|---|---|
| 2,277,203 | 3/1942 | Boult | 94/24 |
| 2,296,453 | 9/1942 | Saffert | 25/155 |
| 4,146,599 | 3/1979 | Lanzetta | 264/35 |
| 4,496,504 | 1/1985 | Steenson et al. | 264/69 |
| 4,714,507 | 12/1987 | Ohgushi | 404/82 |
| 4,748,788 | 6/1988 | Shaw et al. | 52/742 |
| 5,114,475 | 5/1992 | Siegmund et al. | 404/20 |

OTHER PUBLICATIONS 4 page brochure from Ardex, Inc., "Self–Leveling Toppings and Underlayments".
4 page advertising brochure from Schwing America Inc., "Truck or Trailer Mounted Concrete Pump".
4 page advertising brochure from Mayco Pump Corp., "The ST Series of Mid Range Concrete Pumps".
1 page flyer from Quick Mix.
1 page advertisement from Concrete Construction, Aug. 1993, "The Cemen–Tech Advantage".
1 page instructions from L.M. Schofield Company, "Lithotex Top Surface Retarder".
5 page article from Concrete Products, Apr. 1988, regarding Integral Color In Concrete.
9 page article from Concrete Information regarding Finishing Concrete Slabs, Exposed Aggregate, Patterns, and Colors.
32 page article from Portland Cement Association regarding Color & Texture in Architectural Concrete.
36 page article from Journal of the American Concrete Institute, Oct. 1947, vol. 19, No. 2 regarding Cement–Aggregate Reaction in Concrete.
2 page product information sheet from Sinak Corporation regarding Sinak Sealers HLQ–625, HLS–124 and HLQ–250.
6 page document from Information Access Co., 1984 regarding Specialty Concretes.

Primary Examiner—Eileen Dunn Lillis
Assistant Examiner—Kristine Markovich
Attorney, Agent, or Firm—Stetina Brunda Garred & Brucker

[57] ABSTRACT

A surface seeded exposed particulate concrete method of use includes use of small particulates, the particulates not necessarily chemically inert in the concrete mixture. The particulates are broadcast over the upper surface of the concrete, and mixed into the cement paste derived from the concrete matrix by floats and finished by hand sponging. A surface retarder and vapor barrier are applied, and washing and curing operations follow. The present invention adds a chemical treatment of hydrolyzed alkali silica solution, preferably lithium quartz, penetrating the upper surface of the concrete mixture with minerals and silicates within the concrete mix. The resultant exposed particulate concrete has extreme flatness and high wear resistance suitable for high-traffic flooring applications, aesthetics resembling terrazzo or ceramic tile at a fraction of the price, and the strength and resistance to corrosion expected of concrete surfaces.

22 Claims, 1 Drawing Sheet

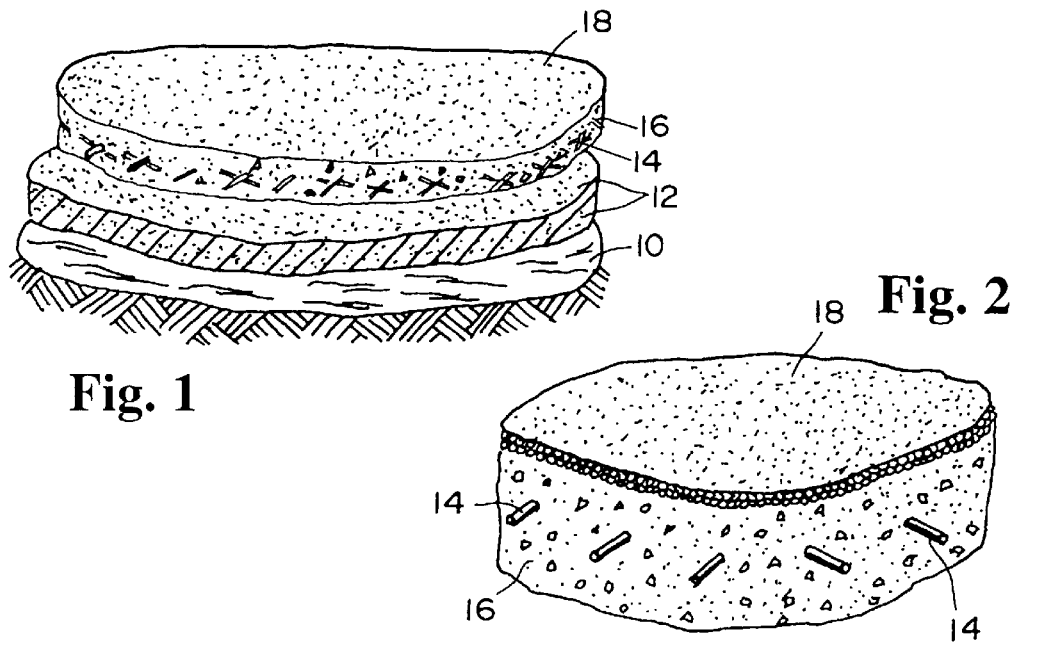
Fig. 1
Fig. 2
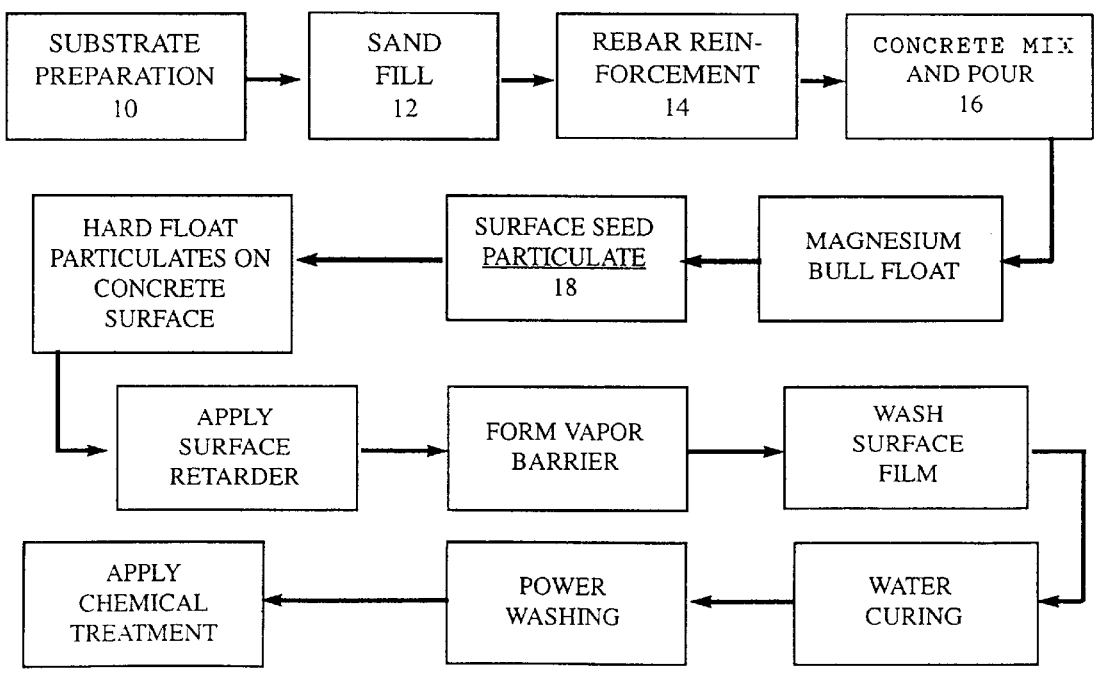
Fig. 3

GLASS CHIP LITHOCRETE AND METHOD OF USE OF SAME

This is a continuation of Ser. No. 08/866,034 filed May 30, 1997.

FIELD OF THE INVENTION

The present invention relates generally to surface seeded exposed aggregate concrete, specifically to exposed particulates not necessarily chemically inert in the upper cement surface of the concrete mixture.

BACKGROUND OF THE INVENTION

Concrete continues to gain in popularity as a building material of choice in flooring applications due to its structural integrity, wear resistance and cost economy. With this growing use, the varying tastes of the public desire improved aesthetics similar to those available in other attractive floorings such as terrazzo or ceramic tile. Those floorings are much more expensive than concrete and do not offer the structural advantages of. continuous concrete paving.

Recently, surface seeded exposed aggregate concrete has come to favor, in which subsequent to the pouring of the concrete, a mass of hard inert materials such as sand or gravel is broadcasted, i.e., seeded, over the top surface of the concrete and subsequently troweled into that surface. Upon curing, the aggregates adheres to the concrete surface and are thus exposed. When first introduced, the surface seeded exposed aggregate technique normally required aggregates approximately three-eighths of an inch diameter mean size or greater to provide sufficient ability to adhere to the concrete upper cement surface, resulting in a rough surface that limited widespread use of the technique in flooring applications.

Applicant recognized this deficiency and developed a method to effectively reduce the size of the aggregate exposed on the surface of the concrete, as disclosed in U.S. Pat. No. 4,748,788 (issued Jun. 7, 1988) and hereby incorporated by reference in its entirety. In that prior invention, Applicant developed a method for producing a decorative slab by pouring a concrete mixture over a prepared subgrade, finishing the upper surface of the mixture with a bull float, spreading a layer of aggregates less than ⅜ inch diameter over the mixture and mixing the two together, applying a chemical retarder and washing and curing the mixture. The resulting exposed aggregate concrete surface provided aesthetics and wear resistance similar to flooring such as granite, marble or stone.

Applicant now aims to expand the colors and surface texture appearances of concrete surfaces which may be produced by the methodology of the surface seeded exposed aggregate technique of the prior invention. One limitation on the variety of surfaces producible has been the perceived non-compatibility of placing certain materials in the concrete mixture, in that scientists have reported of chemical reactions occurring over time degrading the surface. See e.g., McConnell et al. "Cement-Aggregate Reaction in Concrete," J. An. Concrete Inst., Vll. 19, No. 2, Pg. 93 (1947). Silicious materials found in concrete aggregate are well known to react with alkalies in Portland cement, creating silicious gels which lead to expansion, cracking and exudations upon exposed surfaces, though specifications now typically limit alkali content in cement to 0.6% to inhibit such subsequent reactions in concrete aggregates. Minerals other than silicates found in concrete aggregate appear to react only to an insignificant extent, and are usually deemed innocuous.

The relationship of the reactivity of particulates in concrete to numerous factors is recognized as complex. For example, expansion resulting from reaction between aggregates and cement alkalis is believed increased with increases in cement content, due to the greater abundance of available alkalies. For reactive aggregates, maximum expansion of concrete tends to increase as the particulate size of the reactive material decreases. Experience further indicates that the expansion of deleterious aggregate and high-alkali cement may be lower if the aggregate is porous. In addition, some materials may be deleterious for reasons other than reactivity with alkalis released during hydration of cement; for example, sulphates have been known to react with silicates of cement.

No single hypothesis is known to explain quantitatively the variations in degradation of concrete with changes in the makeup of the concrete. Applicant desires to place a variety of potentially reactive particulates of a small diameter into the upper cement surface of concrete flooring. As such, a method of precluding the effects of the potential chemical reactions between desired exposed materials in the concrete mixture must be developed to allow usage of the desired exposed material.

SUMMARY OF THE INVENTION

The present invention specifically addresses and alleviates the above-mentioned deficiencies associated with the prior art. Generally, the present invention comprises a surface seeded exposed particulate concrete and method of producing the same, which utilizes small, potentially reactive particulates,-preferably glass, organic materials such as seashells, metals, composite materials and the like, characterized by having an average mean diameter of approximately less than three-eighths of an inch and a generally rounded or angled exterior, which is permanently adhered to the surface of the concrete to provide a flat, smooth textured concrete surface. The resulting surface is extremely suitable for pedestrian high traffic flow applications. The resultant surface has the architectural appearance of terrazzo, tile or pre-cast pavers, with the structural properties and economy of cast in place concrete.

In the preferred embodiment, the small, rounded particulates are preferably broadcast over the upper surface of the concrete and mixed into the cement/paste derived from the concrete matrix by magnesium, wood or fiberglass floats and finished by hand sponging and steel troweling, though alternatively power troweling may be utilized. A surface retarder and vapor barrier are then applied to cover the concrete surface for approximately 4–24 hours. Subsequently, any surface film is washed away from the surface of the concrete and the concrete is cured by fogging or with a soaker hose. Approximately 30 days later, surface residues are removed with a steam/acid wash providing an exposed particulate concrete surface having extreme flatness and high wear resistance.

After the final washing, the surface is then treated with a hydrolyzed alkali silica solution, preferably hydrolyzed lithium quartz sealer. The hydrolyzed lithium quartz sealer is a proprietary formula available under part number HLQ125, from Sinak Corporation located at 816 Sixth Avenue, San Diego, Calif. This solution penetrates the upper cement surface of the concrete and reacts with the mineral compounds or silicious materials within the concrete matrix.

The methodology utilized for providing the surface seeded exposed particulate concrete of the present invention is designed not only to ensure proper adherence of relatively small sized particulate on the surface of the concrete, but in addition, through specific additional steps the present method ensures proper long term embedment and bonding to concrete of materials previously thought of as non-compatible when used as surface seeded particulates for structural/architectural concrete paving. The resultant exposed particulate concrete surface thereby provides surface aesthetics and wear resistance similar to terrazzo, tile or pre-cast pavers at substantial economic savings.

BRIEF DESCRIPTION OF THE DRAWINGS

These as well as other features of the present invention will become more apparent upon reference to the drawings wherein:

FIG. 1 is a partial perspective cross-sectional view of the surface seeded exposed particulate concrete of the present invention;

FIG. 2 is an enlarged partial perspective view of the concrete mixture having the exposed particulate thereon; and FIG. 3 is a schematic flow diagram of the manipulative steps utilized in producing the surface seeded exposed particulate concrete of the present invention.

DETAILED DESCRIPTION OF THE PREFERRED EMBODIMENT

Referring to FIGS. 1–3, the surface seeded exposed particulate concrete and method of producing the same is pictorially and schematically illustrated. As is conventional, the initial step in the method of the present invention comprises the preparing of the subgrade to the desired elevation engraved and the compacting of the same to preferably 90% compaction. Subsequently, the subgrade is covered with a one inch minimum thick layer of clean, moist fill sand 12. The fill sand 12 is not absolutely necessary, but it is highly desirable to control the hydration process of the concrete. Further, in order to increase the resultant strength of the concrete and inhibit subsequent cracking, reinforcement wire mesh or rebar 14 is positioned upon the bed of fill sand 12.

With the rebar 14 in place, a concrete mix or mixture 16 is poured over the fill sand 12 and rebar 14 respectively, and as is conventional is poured to approximately a three and one half to four inch thickness. Although variations in the concrete mix 16 are fully contemplated, preferably the mixture 16 comprises 70% sand and 30% three-eighth inch mean diameter aggregate combined with a minimum of five sacks of portland cement per cubic yard. Dependent upon individual preferences, various conventional color mixtures may be added to the concrete mix.

The concrete surface is preferably struck off to the desired level plain. However, the mix is preferably not tamped as is conventional, as Applicants have found tamping brings up too many sand fines in most concrete mixes, which would interfere with the subsequent surface seeding of the exposed particulates thereupon. Rather, subsequent to striking off the concrete surface, the surface is floated using a conventional fiberglass, wood or magnesium float. Such floats are characterized by possessing an extremely smooth surface which tends to seal the top surface of the concrete mix 16 and bring out appropriate amounts of cement paste for the subsequent steps of the present invention.

When the upper surface of the concrete mix 16 is still plastic, small size exposed particulate 18 is broadcast over the top surface of the concrete mix 16. In the preferred embodiment, the particulate 18 comprises glass such as silica glass, organic materials such as seashells of marine animals and mollusk, and other various metals and composite materials, all potentially reactive with the concrete mixture 16. The particulates 18 are further characterized as having a mean average diameter of less than three-eighths of an inch and possessing a generally rounded or angled external surface configuration. The particulates 18 should be washed with potable water and air dried prior to being broadcast on the plastic concrete surface. The particulates 18 are typically broadcast over the surface of the concrete mix by use of square point shovels and applied at a rate of approximately one pound per square foot of concrete mix 16 surface, but this may vary depending on the required finish. In this regard, the particulates 18 should not initially depress below the top surface of the concrete mix 16 but rather, should be broadcast solely to cover the same.

After the broadcasting of the particulates 18, the particulates are then floated into the plastic upper surface of the concrete mix 16 using fiberglass, wood or magnesium floats. The mixing of the particulates 18 with the sand cement paste is critical as it ensures that the particulates 18 are thoroughly adhered or bonded to the top surface of the concrete mix 16 upon resultant curing. Then hand sponges may be used in a rotary fashion to further coat the surface seeded particulates 18 with the sand cement paste of the concrete mix 16. Then the entire; surface is finished with steel trowels.

When the resultant particulate 18 and concrete surface 16 has sufficiently set such that a finger impression not in excess of three-eighths of an inch deep is made upon manually pressing with the fingertips thereupon, a conventional surface retarder, preferably a citric acid based surface retarding agent, is spread to uniformly cover the top surface of the concrete mix 16. The surface retarder slows down the hydration process of the concrete by penetrating the top surface of the concrete mix to a depth of approximately one-eighth inch.

After the uniform coverage of the surface retarder thereon, the top surface of the concrete mix 16 is covered with either a plastic sheathing membrane or a liquid evaporation barrier, maintained thereupon for a period of approximately 2–24 hours. After about 4 hours the surface can usually support a workman without leaving an impression, and the sheathing is removed and the top surface may be loosened with clean wet sponges working in a circular fashion, revealing the top surface of the embedded particulates 18. The surface is then washed with clean water at low pressure and the heavy latents removed with a soft broom. The washing procedure and light bristle brushing preferably removes no more than five percent of the particulates 18 from the top surface of the concrete mix 16. Subsequent to the washing, the concrete mix 16 is cured for a minimum of seven (7) days with water only by use of a conventional fogger or soaker hose. Craft paper or liquid membrane cures may be used in place of water as job conditions dictate. Preferably after curing for a minimum of seven (7) days, the surface is subject to conventional power washing using 3,000 PSI water pressure at a temperature of approximately 220° F. A mixture of 10–50% muriatic acid is preferably introduced into the hot water wash. The entire surface is then flushed with clean hot water. Preferably 28 days after the initial concrete placement, the surface is again washed with the high pressure/hot water wash to remove any efflorescence or discoloration from the surface. Sandblasting, acid etching or grinding and polishing may also be used to create texture variations on the surface.

After the final washing of the concrete, the top surface is treated with a hydrolyzed alkali silica solution, preferably lithium quartz sealer (approximately 12.5% lithium compound by volume). Other members of the alkali family of metals which may be suitable include sodium, potassium, rubidium, sesium, and francium. Other abundant silicone containing materials which may be suitable include feldspars, amphiboles or pyroxenes, and mica. The SINAK HLQ sealer is applied, in light even coats using a sprayer or brush, to a surface having a temperature between 50°–100° F. The hydrolyzed lithium quartz sealer penetrates the top surface of the concrete mix 16, again to a depth of approximately one-eighth of an inch. The chemical treatment reacts with the mineral compounds or silicious materials within the concrete mix. The reaction causes formation of an insoluble silicate structure, which acts as a protective barrier, reducing the permeability of the surface to water. Applicant believes that minimizing the addition of moisture over time minimizes the undesired expansion and cracking, even given some chemical reaction in the concrete involving the potentially reactive particulates. Applicant also believes that minimizing the addition of moisture minimizes the scope of the chemical reaction involving the non-inert particulates. Of course, this chemical treatment may be omitted when non-reactive aggregates are used.

The resultant surface seeded exposed particulate concrete besides exhibiting an extremely flat exposed particulate surface suitable for pedestrian and vehicular paving applications, is also not subject to deterioration from the chemical reaction from the non-inert particulates and minerals and silicates found in the concrete mix 16. The surface texture and color approximates conventional flooring surfaces such as terrazzo, or ceramic tile, and this resemblance may be further accentuated by cutting the concrete surface into rectangular or irregular grids. The present invention comprises a significant improvement in the art by provided surface seeded exposed particulate concrete, wherein a large variety of exposed particulates not necessarily chemically inert may be introduced into the upper cement surface of the concrete mixture.

Although for purposes of explanation certain material specifications have been disclosed herein, those skilled in the art will recognize that various modifications may be made without departing from the spirit of the present invention, and such modifications are contemplated.

What is claimed is:

1. A method of producing surface seeded exposed particulate concrete having a generally flat exposed particulate surface suitable for flooring applications, the exposed particulate surface comprising a material reactable with a hydrolyzed alkali silica to form an insoluble silicate structure, the method comprising the steps of:

preparing a subgrade to a desired grade;

pouring a concrete mix over said subgrade;

screeding said concrete mix to a desired grade and forming a top surface thereof;

finishing the top surface of said concrete mix with a float to seal said top surface and disposing a quantity of cement/fines derived from said concrete mix at said top surface to form an upper surface of cement/fines concrete paste;

broadcasting a quantity of particulate of a potentially reactive material upon said concrete paste, the particulate having a mean diameter of less than three-eighths of one inch upon said top surface and reactable with said hydrolyzed alkali silica;

mixing said quantity of particulate into said quantity of cement/fines concrete paste with a float to form an exposed surface of a depth of a mixture of surface-concentrated particulate and cement/fines concrete paste;

applying a surface retarder uniformly over said exposed surface of said surface-concentrated particulate and cement/fines concrete paste;

washing surface films from said exposed surface;

curing said concrete mix and paste to form cured mix and cured paste;

washing said exposed surface to remove surface residue therefrom; and applying a chemical treatment of hydrolyzed alkali silica solution uniformly over said exposed surface in a quantity sufficient to penetrate only the depth of the surface-concentrated particulate and cement/fines concrete paste.

2. The method of claim 1 wherein the hydrolyzed alkali silica is a hydrolyzed lithium quartz solution.

3. The method of claim 1 wherein said applying of chemical treatment causes penetration of said hydrolyzed alkali metal and silica compound into said upper surface of said concrete mixture through a distance greater than the mean diameter of said particulate.

4. The method of claim 1 wherein said particulate comprises glass.

5. The method of claim 1 wherein said particulate comprises organic materials.

6. The method of claim 5 wherein said organic material comprises sea shells.

7. The method of claim 1 wherein prior to broadcasting particulates, the method comprises a further step of:

washing with potable water and air drying the particulates.

8. The method of claim 1 wherein said applying of said surface wherein said applying of said surface retarder causes penetration of said surface retarder into said upper surface of said concrete mixture through a distance greater than the mean diameter of said particulate.

9. The method of claim 1 wherein said particulate is broadcast over the upper surface of said concrete mixture at an approximate rate of one pound per square foot of concrete mixture.

10. The method of claim 1 wherein said mixing step comprises using a float in a circular motion to cover said aggregate with said cement/fines paste.

11. The method of claim 1 wherein between said mixing and said applying said surface retarder steps, said method comprises a further step of:

sponging in a circular motion any areas of said upper surface of said concrete mixture.

12. The method of claim 1 wherein said washing of surface film comprises the steps of applying water to said upper surface of said concrete mixture and lightly brushing said upper surface of said concrete mixture.

13. The method of claim 11 wherein said lightly brushing step removes no more than five percent of said particulate from said upper surface of said concrete mixture.

14. The method of claim 13 wherein said washing of said upper surface of said concrete mixture to remove surface residue therefrom comprises washing said upper surface of said concrete with a mixture of water and muriatic acid.

15. The method of claim 1 wherein between said applying of said surface retarder and said washing surface film step said method comprises the further step of covering said upper surface of said concrete mixture with a vapor barrier.

16. The method of claim 1 wherein said covering said upper surface of said concrete mixture with a vapor barrier extends for a period of two to twenty-four hours.

17. The method of claim 1 wherein said curing step comprises curing said concrete mixture by use of a fogger.

18. The method of claim 1 wherein said curing step comprises curing said concrete mixture by use of a soaker hose.

19. The method of claim 1 comprising the further step of placing reinforcement means upon said prepared subgrade to be disposed within said poured concrete mixture.

20. The method of claim 1 wherein said pouring step comprises the further step of mixing said concrete mixture with a color additive.

21. The method of claim 1 wherein after curing said concrete mixture, the method comprises a further step of:
    altering the surf ace roughness of said upper surface of said concrete mixture.

22. A surface seeded exposed particulate concrete product formed by the method of claim 1.

* * * * *

UNITED STATES PATENT AND TRADEMARK OFFICE
CERTIFICATE OF CORRECTION

| | | |
|---|---|---|
| PATENT NO. | : 6,033,146 | Page 1 of 1 |
| APPLICATION NO. | : 09/271811 | |
| DATED | : March 7, 2000 | |
| INVENTOR(S) | : Lee A. Shaw and Ronald D. Shaw | |

It is certified that error appears in the above-identified patent and that said Letters Patent is hereby corrected as shown below:

Title Page, Item (63),

The Related U.S. Application Data should include: "which is a continuation of application No. 08/493,933, June 23, 1995."

Signed and Sealed this

Twenty-first Day of September, 2010

David J. Kappos
*Director of the United States Patent and Trademark Office*